(12) United States Patent
Zheng et al.

(10) Patent No.: US 8,937,853 B2
(45) Date of Patent: Jan. 20, 2015

(54) TRANSDUCER HEAD TEMPERATURE MONITORING

(71) Applicant: Seagate Technology LLC, Cupertino, CA (US)

(72) Inventors: Xuan Zheng, Savage, MN (US); Timothy William Stoebe, Minnetonka, MN (US); Jorge Hanchi, St. Louis Park, MN (US); Kaizhong Gao, North Oaks, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/339,157

(22) Filed: Jul. 23, 2014

(65) Prior Publication Data

US 2014/0334275 A1 Nov. 13, 2014

Related U.S. Application Data

(63) Continuation of application No. 13/023,198, filed on Feb. 8, 2011, now Pat. No. 8,792,311.

(51) Int. Cl.
*G11B 11/00* (2006.01)
*G11B 5/60* (2006.01)
*G11B 5/00* (2006.01)

(52) U.S. Cl.
CPC ........ *G11B 5/607* (2013.01); *G11B 2005/0021* (2013.01)
USPC ...................................................... 369/13.26

(58) Field of Classification Search
None
See application file for complete search history.

(56) References Cited

U.S. PATENT DOCUMENTS

| 3,745,360 | A | 7/1973 | Paul |
| 5,074,686 | A | 12/1991 | Fare |
| 5,130,866 | A | 7/1992 | Klaassen et al. |
| 5,527,110 | A | 6/1996 | Abraham et al. |
| 5,777,815 | A | 7/1998 | Kasiraj et al. |
| 5,991,113 | A | 11/1999 | Meyer et al. |
| 6,396,783 | B1 | 5/2002 | Bell, Jr. et al. |
| 6,801,376 | B2 | 10/2004 | Smith |
| 6,856,633 | B2 * | 2/2005 | Nasu et al. ........................ 372/34 |
| 6,865,040 | B2 | 3/2005 | Fayeulle et al. |
| 6,950,266 | B1 | 9/2005 | McCaslin et al. |
| 6,972,919 | B2 | 12/2005 | Suk |
| 7,027,251 | B1 | 4/2006 | Darragh et al. |
| 7,088,545 | B1 | 8/2006 | Singh et al. |
| 7,092,193 | B1 | 8/2006 | McKenzie et al. |
| 7,130,141 | B2 | 10/2006 | Chey et al. |
| 7,180,692 | B1 | 2/2007 | Che et al. |
| 7,436,619 | B2 | 10/2008 | Takahashi |

(Continued)

*Primary Examiner* — Brenda Bernardi
(74) *Attorney, Agent, or Firm* — HolzerIPLaw, PC

(57) ABSTRACT

Changes in the thermal boundary condition near a close point of an ABS to a media indicate proximity of the ABS with the media. Before contact, heat conduction from the ABS is primarily through convective and/or ballistic heat transfer to air between the ABS and the media. After contact, heat flux primarily flows from the ABS to the media through solid-solid conductive contact. Further, a light source within a HAMR transducer head may create additional thermal variations within the transducer head. These thermal variations create temperature variations within the transducer head. Two resistance temperature sensors on the transducer head at varying distances from the close point and/or light source measure these temperature variations. A temperature difference between the two resistance temperature sensors indicates proximity of the close point to the media and/or light output.

20 Claims, 11 Drawing Sheets

(56) References Cited

U.S. PATENT DOCUMENTS

| | | |
|---|---|---|
| 7,453,557 B2 * | 11/2008 | Huang et al. ................ 356/73 |
| 7,477,470 B2 | 1/2009 | Leis et al. |
| 7,589,928 B2 | 9/2009 | Roy et al. |
| 7,800,858 B1 | 9/2010 | Bajikar et al. |
| 8,139,310 B1 | 3/2012 | Hogg |
| 2004/0027949 A1 * | 2/2004 | Matsuura et al. ......... 369/47.51 |
| 2011/0157736 A1 | 6/2011 | Contreras |
| 2011/0157740 A1 | 6/2011 | Baumgart et al. |
| 2011/0299367 A1 | 12/2011 | Naniwa et al. |
| 2012/0120522 A1 | 5/2012 | Johnson et al. |

* cited by examiner

TRANSDUCER HEAD TEMPERATURE MONITORING

CROSS-REFERENCE TO RELATED APPLICATIONS

This application is a continuation application of U.S. patent application Ser. No. 13/023,198, filed on Feb. 8, 2011, entitled "Transducer Head Temperature Monitoring," now issued as U.S. Pat. No. 8,792,311 on Jul. 29, 2014, which is hereby incorporated by reference in its entirety.

SUMMARY

Implementations described and claimed herein provide a transducer head comprising two temperature sensors at two disparate distances from a close point of the transducer head with a media. A difference between temperatures of each of the two temperature sensors indicates proximity of the transducer head to the media at the close point.

Other implementations are also described and recited herein.

BRIEF DESCRIPTIONS OF THE DRAWINGS

DETAILED DESCRIPTIONS

Figure 1B:
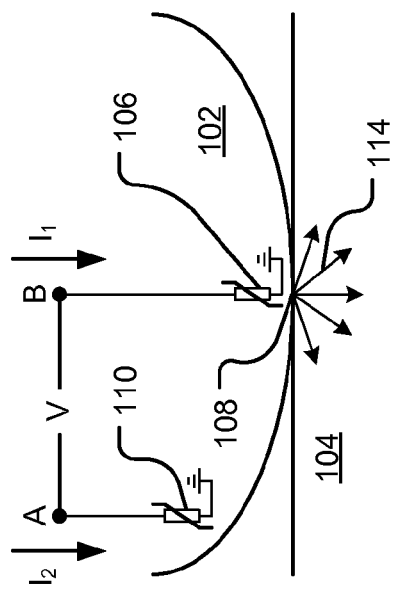
FIG. 1B illustrates an example transducer head in contact with a media, having a first resistance temperature sensor at or near a close point and a second resistance temperature sensor spaced away from the close point.

Contact detection technologies are used for commissioning or periodic adjustment operations that set flying height of a thin film transducer head in moving-media data storage systems (e.g., rotating magnetic and/or optic disc drives). The flying height is defined as the spacing between the surface of a spinning storage media and the lowest point on the slider assembly (i.e., the close point) in the data storage systems. A smaller flying height results in optimized performance of the data storage systems. More specifically, higher contact detection repeatability enables lower active clearance and thus higher recording density. Further, higher contact detection sensitivity reduces wear and optimizes reliability of the data storage systems.

Some contact detection technologies in moving-media data storage systems utilize one or more vibration sensors incorporated on or near the slider. When the slider contacts a corresponding storage media, vibration amplitude of the slider changes and the vibration sensor(s) detect the contact.

In addition to detecting vibration, the presently disclosed technology uses changes in the thermal boundary condition near a close point of an air-bearing slider (ABS) upon proximity and/or contact with a moving data storage media to detect proximity and/or contact of the ABS with the media. Before contact, heat conduction from the ABS is primarily through convection and/or ballistic heat transfer to the air in the gap between a transducer head on the ABS and the media. After contact, heat flux primarily flows from the transducer head to the media through solid-solid conductive contact and/or a close proximity effect at the close point. This is because solid-solid contact and/or two solids in very close proximity to one another have a higher thermal conductivity compared to solid-air convection or ballistic heat transfer. In addition, after contact, friction-induced heating where the close point meets the media may contribute to changes in the thermal boundary condition.

As a result, the thermal boundary condition at the close point of the ABS as compared to elsewhere on the ABS varies depending on whether the close point of the ABS is in contact with the media or not. These thermal boundary condition variations create temperature variations on the ABS. In one specific implementation, the close point is cooler than other points on the ABS spaced away from the close point when in close proximity to the media. In another implementation, the close point is warmer than other points on the ABS spaced away from the close point upon contact with the media.

Measurements of these temperature variations have a DC component associated with an average fly height change and an AC component associated with vertical modulation of the ABS as it flies over the media. The presently disclosed technology focuses in part on implementing two resistance temperature sensors on an ABS, one near the close point and one spaced away from the close point. A temperature difference between the two resistance temperature sensors indicates proximity and/or contact of the close point with the media. The two resistance temperature sensors may detect the DC and/or AC temperature variations and may be implemented on modulating or non-modulating sliders.

The presently disclosed technology may also be used to measure output of a light source (e.g., a laser diode), output of a heater, and/or head-media spacing (HMS) in a "heat assisted magnetic recording" storage system. "Heat assisted magnetic recording," optical assisted recording or thermal assisted recording (collectively hereinafter HAMR), generally refers to locally heating a recording medium to reduce the coercivity of the recording medium so that an applied magnetic writing field can more easily affect magnetization of the recording medium during a temporary magnetic softening of the recording medium caused by the local heating. HAMR allows for the use of small grain media, which allows for recording at increased areal densities, with a larger magnetic anisotropy at room temperature assuring a sufficient thermal stability. HAMR can be applied to any type of storage media, including for example, tilted media, longitudinal media, perpendicular media, and/or patterned media.

Effective HAMR relies on precise local heating of the recording medium. The presently disclosed technology may be used to monitor the output of the light source used to heat the recording medium. Further, the presently disclosed technology may be used to monitor the heat output of a heater on the HAMR recording head. Still further, the presently disclosed technology may measure HMS between the HAMR recording head and the recording media.

Figure 1A:
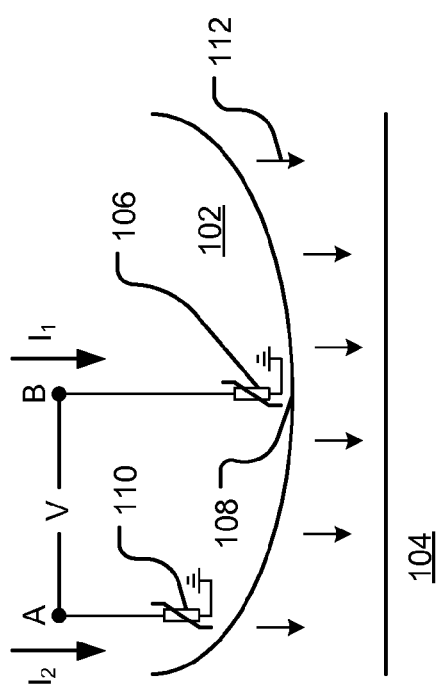
FIG. 1A illustrates an example transducer head not in contact with a media, having a first resistance temperature sensor at or near a close point and a second resistance temperature sensor spaced away from the close point.

FIG. 1A illustrates an example transducer head 102 (not in contact with a media 104), having a first resistance temperature sensor 106 at or near a close point 108 and a second resistance temperature sensor 110 spaced away from the close point 108. The surface of the transducer head 102 facing the media 104 is often slightly convex (shown exaggerated for illustrative purposes), thus yielding the close point 108 (as compared to other points on the surface of the transducer head 102) facing the media 104. Heat-transfer arrows (e.g., arrow 112) illustrate heat conduction from the transducer head 102 primarily through convective and/or ballistic heat transfer to the air in the gap between the transducer head 102 and the media 104. Temperature sensors 106, 110 are specifically configured to detect contact of the close point 108 of the transducer head 102 with the media 104.

The first resistance temperature sensor 106 has a resistance symbolized by $R_1$ (not shown) and is located at or near the close point 108, which in many implementations is near a write pole (not shown) on the transducer head 102. The second resistance temperature sensor 110 has a resistance symbolized by $R_2$ (not shown) and is spaced away from the close point 108, which in many implementations is near a reader (not shown) on a transducer head 102. In one implementation, the second resistance temperature sensor 110 is merely 2-30 micrometers away from the first resistance temperature sensor 106. However, other distances between the first resistance temperature sensor 106 and second resistance temperature sensor 110 are contemplated herein.

In one implementation, the resistances of the first and second resistance temperature sensors 106, 110 are equal at the same temperature. Current source $I_1$ powers the first sensor 106 and current source $I_2$ powers the second sensor 110. During a calibration procedure, a user monitors voltage (V) between terminals A and B and adjusts a ratio between $I_1$ and $I_2$ until $V=I_2R_2-I_1R_1=0$. In an alternative implementation, there is a known resistance differential (or difference) between the first and second resistance temperature sensors 106, 110. In a further implementation, voltage (V) is calibrated to a non-zero magnitude.

FIG. 1B illustrates an example transducer head 102 in contact with a media 104, having a first resistance temperature sensor 106 at or near a close point 108 and a second resistance temperature sensor 110 spaced away from the close point 108. Heat-transfer arrows (e.g., arrow 114) illustrate heat flux primarily flowing from the transducer head 102 to the media 104 through solid-solid conductive contact at the close point 108. Temperature sensors 106, 110 are configured to detect contact of the close point 108 of the transducer head 102 with the media 104.

Close proximity of the close point 108 with the media 104 may dissipate additional heat from the transducer head 102. Further, contact of the close point 108 with the media 104 may generate additional heat in the transducer head 102. Both heat-dissipation and heat-generation at the close point 108 is referred to herein as a heat variation source. Further, the contact and/or proximity of the transducer head 102 with the media 104 is referred to herein as a performance metric.

When the transducer head 102 is active and the close point 108 is brought into contact with the media 104 as shown moving from FIG. 1A to FIG. 1B, a temperature change for resistance temperature sensor 106 ($\Delta T_1$) and a temperature change for resistance temperature sensor 110 ($\Delta T_2$) occurs. A voltage (V) between terminals A and B is defined by $V=I_2R_2(1+c\Delta T_2)-I_1R_1(1+c\Delta T_1)=cI_1R_1(\Delta T_2-\Delta T_1)$, wherein c is the temperature coefficient of resistance. As the close point 108 is brought closer to the media 104, but before contact, $\Delta T_1$ is very close to $\Delta T_2$ and V approximately equals zero. After contact (see FIG. 2A), $\Delta T_2$ becomes different than $\Delta T_1$ because additional heat is conducted away from the close point 108 into the media 104 via solid-solid contact, a close proximity effect, and/or friction-induced heat is generated at the close point. As a result, voltage (V) becomes significantly greater than zero and indicates contact.

In some implementations, noises created by ambient temperature variation, heater power, write coil power, reader current, mechanical vibrations, and/or electronic signals make the difference between $\Delta T_1$ and $\Delta T_2$ difficult to measure. By using a modulated sensing method, noises that are at frequencies different from the modulation frequency may be eliminated. In one implementation, a heater power (discussed in more detail below) is modulated at a certain frequency with constant $I_1$ and $I_2$ current using a thermal actuation controller. For example, the heater power is modulated at a frequency of 100 Hz while $I_1$ and $I_2$ both approximately equal 1 mA DC. In another implementation, $I_1$ and $I_2$ are modulated at a synchronized frequency using a current modulator while the heater power is constant. In either implementation, a lock-in technique is used to analyze the voltage (V). For example, software or hardware such as commercial integrated circuit demodulators perform lock-in signal demodulation of voltage (V).

Figure 2B:
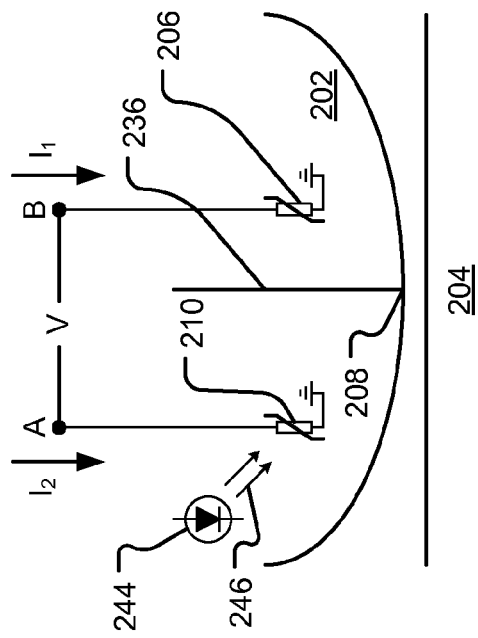
FIG. 2B illustrates an example transducer head having a first resistance temperature sensor spaced away from a powered laser diode and a second resistance temperature sensor at or near the powered laser diode.
Figure 2A:
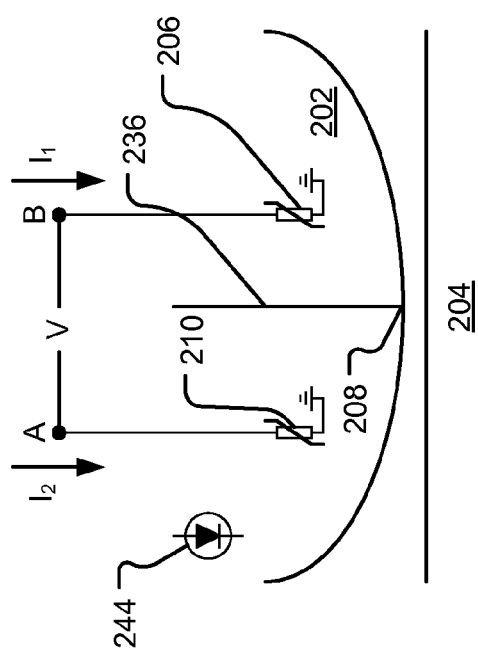
FIG. 2A illustrates an example transducer head having a first resistance temperature sensor spaced away from an un-powered laser diode and a second resistance temperature sensor at or near the un-powered laser diode.

FIG. 2A illustrates an example transducer head 202 having a first resistance temperature sensor 206 spaced away from an un-powered laser diode 244 and a second resistance temperature sensor 210 at or near the un-powered laser diode 244. The surface of the transducer head 202 facing a media 204 is often slightly convex (shown exaggerated for illustrative purposes), thus yielding a close point 208 (as compared to other points on the surface of the transducer head 202) facing the media 204. The temperature sensor 206 and temperature sensor 210 are separated by a return pole 236, which at least partially isolates the temperature sensor 206 from heat generated by the laser diode 244 when the laser diode 244 is in operation. In this implementation, the temperature sensors 206, 210 are equidistant from the close point 208. Therefore, convective and/or ballistic heat transfer to the air in the gap between the transducer head 1202 and the media 204 should affect temperature sensors 206, 210 equally. Temperature sensors 206, 210 are configured to detect heat output of the laser diode 244.

The first resistance temperature sensor 206 has a resistance symbolized by $R_1$ and is spaced away from the laser diode 244. Temperature sensor 206 in many implementations is adjacent a return pole (not shown) on a side opposite from the laser diode 244, on the transducer head 202. The second resistance temperature sensor 210 has a resistance symbolized by $R_2$ and is located at or near the laser diode 244, which in many implementations is also adjacent the return pole (not shown), however on the same side of the return pole as the laser diode 244 on the transducer head 202. In one implementation, the second resistance temperature sensor 210 is merely 2-30 micrometers away from the first resistance temperature sensor 206. However, other distances between the first resistance temperature sensor 206 and second resistance temperature sensor 210 are contemplated herein.

In one implementation, the resistances of the first and second resistance temperature sensors 206, 210 are equal at the same temperature. Current source $I_1$ powers the first sensor 206 and current source $I_2$ powers the second sensor 210. During a calibration procedure, a user monitors voltage (V) between terminals A and B and adjusts a ratio between $I_1$ and $I_2$ until $V=I_2R_2-I_1R_1=0$. In an alternative implementation, there is a known resistance difference between the first and second resistance temperature sensors 206, 210. In a further implementation, voltage (V) is calibrated to a non-zero magnitude.

FIG. 2B illustrates an example transducer head 202 having a first resistance temperature sensor 206 spaced away from a powered laser diode 244 and a second resistance temperature sensor 210 at or near the powered laser diode 244. Heat-transfer arrows (e.g., arrow 246) illustrate heat flux primarily flowing from the laser diode 244 to the second resistance temperature sensor 210. Temperature sensors 206, 210 are configured to detect heat output of the laser diode 244.

The powered laser diode 244 and/or any paths from the powered laser diode 244 to the media are referred to herein as a heat variation source. Further, the light and/or heat output of the powered laser diode 244 and/or any paths from the powered laser diode 244 to the media 204 are referred to herein as a performance metric.

When the laser diode 244 is powered as shown moving from FIG. 2A to FIG. 2B, a temperature change for the resistance temperature sensor 206 ($\Delta T_1$) and the resistance temperature sensor 210 ($\Delta T_2$) occurs. A voltage (V) between terminals A and B is defined by $V=I_2R_2(1+c\Delta T_2)-I_1R_1(1+c\Delta T_1)=cI_1R_1(\Delta T_2-\Delta T_1)$, wherein c is the temperature coefficient of resistance. As the close point 108 is moved closer and/or further from the media 104, but before the laser diode 244 is powered (see FIG. 1A), $\Delta T_1$ is very close to $\Delta T_2$ and V approximately equals zero. After the laser diode 244 is powered (see FIG. 2A), $\Delta T_2$ becomes different from $\Delta T_1$ because more heat is conducted to the second resistance temperature sensor 210 than the first resistance temperature sensor 206. As a result, voltage (V) becomes significantly greater than zero and is a metric of the magnitude of heat generated by the laser diode 244.

In some implementations, noises created by ambient temperature variation, heater power, write coil power, reader current, mechanical vibrations, and/or electronic signals make the difference between $\Delta T_1$ and $\Delta T_2$ difficult to measure. By using a modulated sensing method, noises that are at frequencies different from the modulation frequency may be eliminated. In one implementation, heater power (discussed in more detail below) is modulated at a certain frequency with constant $I_1$ and $I_2$ current using a thermal actuation controller. For example, the heater power is modulated at a frequency of 100 Hz while $I_1$ and $I_2$ both approximately equal 1 mA DC. In another implementation, $I_1$ and $I_2$ are modulated at a synchronized frequency using a current modulator while the heater power is constant. In either implementation, a lock-in technique is used to analyze the voltage (V). For example, software or hardware such as commercial integrated circuit demodulators perform lock-in signal demodulation of voltage (V).

Figure 3B:
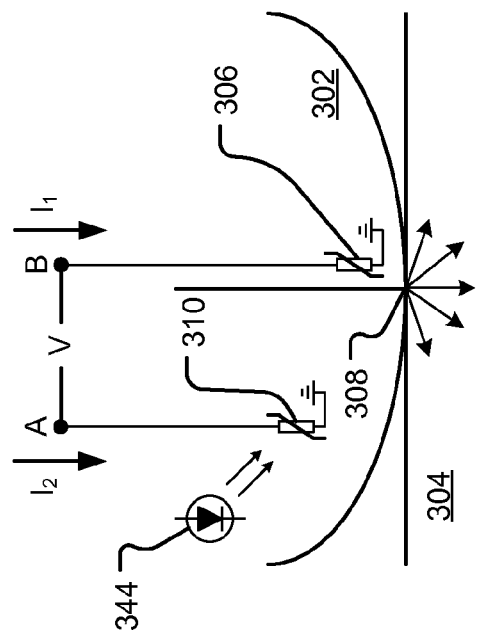
FIG. 3B illustrates an example transducer head in contact with a media, having a first resistance temperature sensor spaced away from a powered laser diode and at or near a close point and a second resistance temperature sensor at or near the powered laser diode and spaced away from the close point.
Figure 3A:
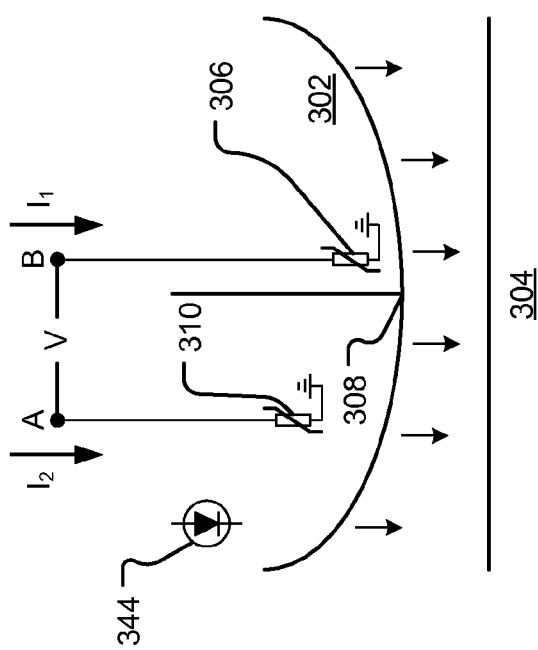
FIG. 3A illustrates an example transducer head not in contact with a media, having a first resistance temperature sensor spaced away from an un-powered laser diode and at or near a close point and a second resistance temperature sensor at or near the un-powered laser diode and spaced away from the close point.

FIG. 3A illustrates an example transducer head 302 not in contact with a media 304, having a first resistance temperature sensor 306 spaced away from an un-powered laser diode 344 and at or near a close point 308 and a second resistance temperature sensor 310 at or near the un-powered laser diode 344 and spaced away from the close point 308. Temperature sensors 306, 310 are oriented in a manner that is both capable of detecting contact of the close point 308 of the transducer head 302 with the media 304 as disclosed with respect to FIG. 1A and detecting heat output of the laser diode 344 as disclosed with respect to FIG. 2A.

FIG. 3B illustrates an example transducer head 302 in contact with a media 304, having a first resistance temperature sensor 306 spaced away from a powered laser diode 344 and at or near a close point 308 and a second resistance temperature sensor 310 at or near the powered laser diode 344 and spaced away from the close point 308. By holding the laser diode 344 in a constant powered or unpowered state and bringing the close point 308 in contact with the media 304, the contact may be detected by a spike in the temperature of the first resistance temperature sensor 306 as compared to the second resistance temperature sensor 310, as disclosed in detail with respect to FIGS. 1A and 1B. Further, by holding the transducer head 302 at a constant distance from the media 304, the heat output of the laser diode 344 may be detected by comparing the temperature of the first resistance temperature sensor 306 with the temperature of the second resistance temperature sensor 310, as disclosed in detail with respect to FIGS. 2A and 2B.

Close proximity of the close point 308 with the media 304 may dissipate additional heat from the transducer head 302. Further, contact of the close point 308 with the media 304 may generate additional heat in the transducer head 302. Still further, the laser diode 344 may generate additional heat in the transducer head 302. Both heat-dissipation and heat-generation at the close point 308 as well as heat-generation at the laser diode 344 and/or any paths from the laser diode 344 to the media 304 are referred to herein as a heat variation source. Further, the contact and/or proximity of the transducer head 302 with the media 304 and the light and/or heat output of the powered laser diode 344 and/or any paths from the powered laser diode 344 to the media 304 is referred to herein as a performance metric.

Figure 4:
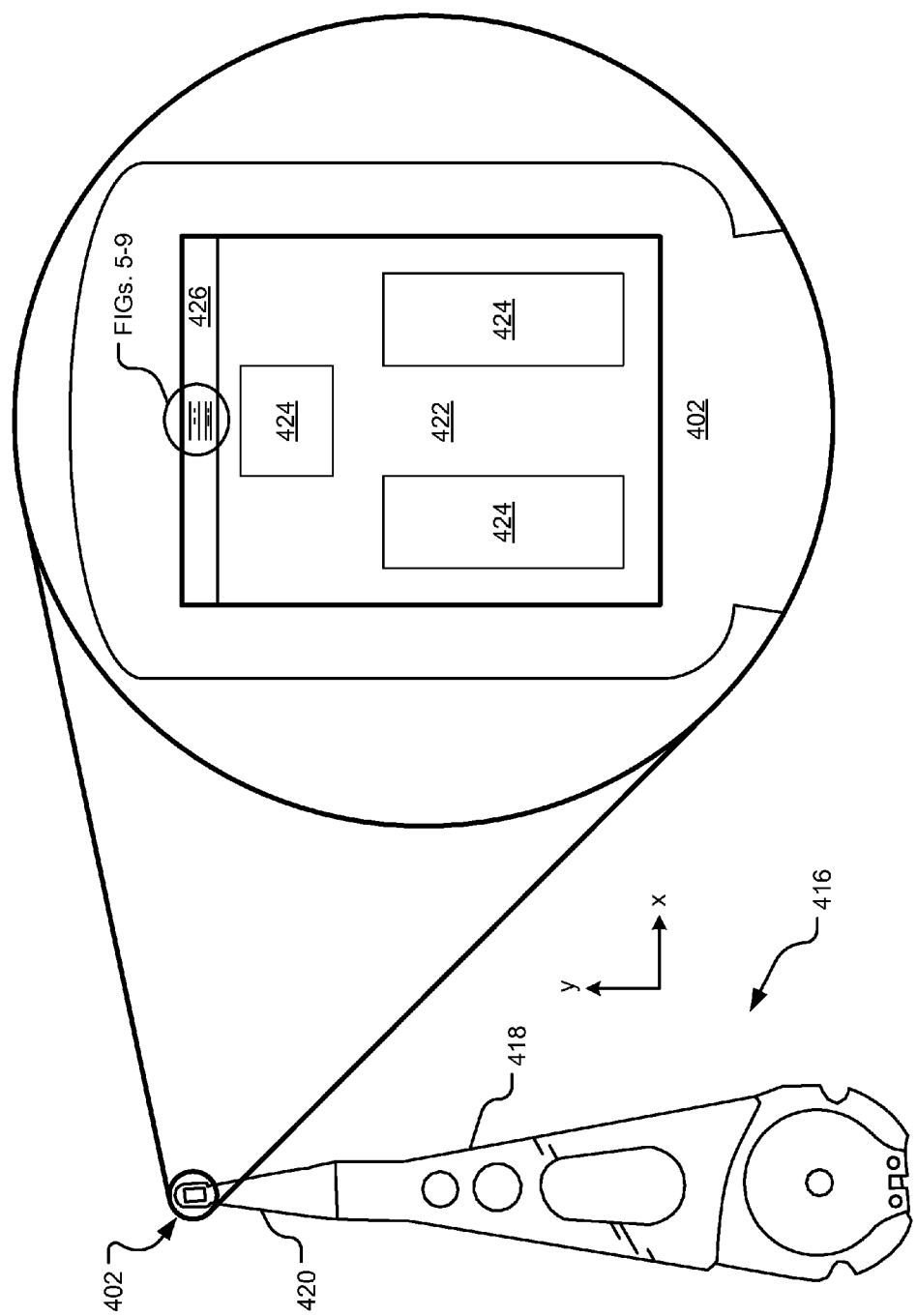
FIG. 4 illustrates a plan view of an example actuator assembly with a detail view of a transducer head with differential resistance temperature sensors according to the presently disclosed technology.

FIG. 4 illustrates a plan view of an example actuator assembly 416 with a detail view of a transducer head 402 with differential resistance temperature sensors according to the presently disclosed technology. The actuator assembly 416 includes one or more actuator arms (e.g., actuator arm 418) with one or more flexures (e.g., flexure 420) extending from each of the actuator arms, generally in the y-direction. Mounted at the distal end of each of the flexures is a transducer head (e.g., head 402) that includes an air-bearing slider (e.g., slider 422) enabling the transducer head to fly in close proximity above the corresponding surface of an associated media. The actuator assembly 416 with the transducer head 402 of FIG. 4 is shown from a perspective looking up from the media.

Each slider incorporates air-bearing features (e.g., features 424) to control the aerodynamic interaction between the slider and the media there under. This aerodynamic interaction sets and controls fly height of the transducer head 402. Microelectronics (such as those shown in detail in FIGS. 5-9), including differential resistance temperature sensors, are mounted on a trailing edge of each slider. In other implementations, the microelectronics are mounted on a leading edge or side edge of each slider. The microelectronics are separated from each slider and sealed from the environment by layers of dielectric material (e.g., dielectric 426). The microelectronics may also be mounted on an air-bearing feature, or elsewhere on each slider.

Figure 5:
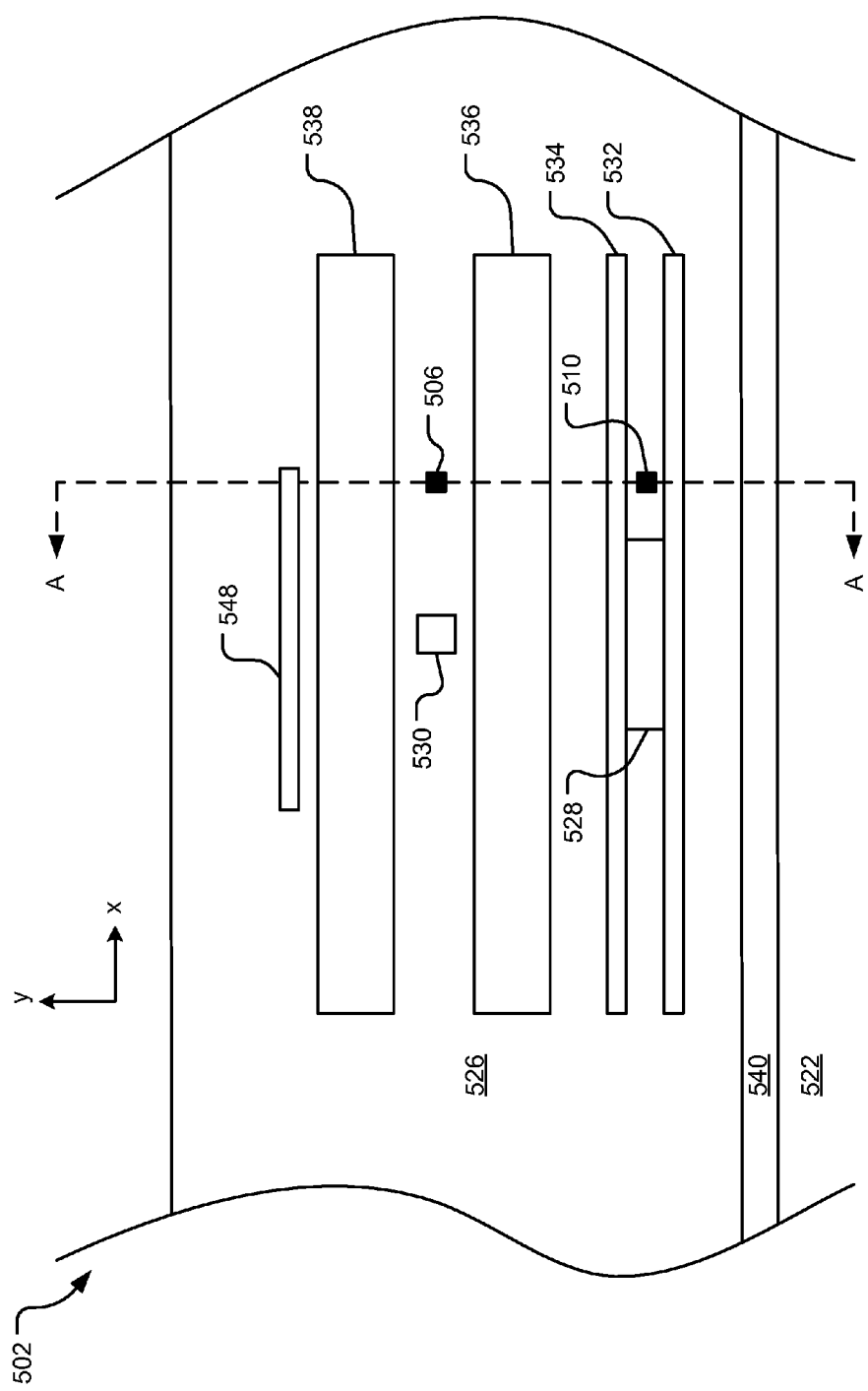
FIG. 5 illustrates a plan view of an example transducer head deposited on a trailing surface of a slider including a pair of differential resistance temperature sensors.

FIG. 5 illustrates a plan view of an example transducer head 502 deposited on a trailing surface of a slider 522 including a pair of differential resistance temperature sensors 506, 510. The transducer head 502 includes various microelectronic components for reading and writing information to and from a storage media (i.e., a reader 528, a writer 530, a first reader shield 532, a second reader shield 534, a first return pole 536, a second return pole 538, and a heater 548) which are mounted on a substrate 540 and separated by dielectric material 526. The microelectronic components are also separated from an external environment by the dielectric material 526. In other implementations, additional microelectronic components may be deposited on the slider 522. The transducer head 502 is not shown to scale in FIG. 5. In many implementations, thickness in the y-direction is very small with respect to the width in the x-direction of the substrate 540, the microelectronic components, and/or the dielectric material 526.

The transducer head 502 may be installed onto the slider 522 using any of a variety of microelectronic fabrication techniques. Often the microelectronic components are deposited onto the substrate 540 using one or more thin films. The thin films may be patterned to give the layers distinctive features or form openings in the layers. The thin films may also include the dielectric material 526 to separate the microelectronic components. Further, the thin films may also be etched to remove some undesirable portions of the thin films or the substrate 540. Still further, the thin films and/or substrate 540 may be further modified using processes including, but not limited to doping (using thermal diffusion and/or ion implantation), micro-cutting/micro-fabrication, chemical-mechanical planarization, wafer cleaning or other surface preparation, and wire bonding.

In an implementation where the microelectronic components are manufactured using deposition, the dielectric material 526 is first deposited on the substrate 540. The dielectric material 526 is typically a non-conductive material that serves to bond the microelectronic components to the substrate 540 and/or anchor the microelectronic components within the dielectric material 526. The dielectric material 526 may also fill gaps between various microelectronic components and may encompass the microelectronic components to protect them from damage from an external environment (e.g., physical impact, contaminants, and oxidation).

Moving in the y-direction, the first reader shield 532 is deposited on the dielectric material 526. The reader 528 and second resistance temperature sensor 510 are deposited on the first reader shield 532 and the second reader shield 534 is deposited on the reader 528 and the second resistance temperature sensor 510. The reader shields 532, 534 may serve to electrically and/or magnetically isolate the reader 528 from other components of the transducer head 502 (e.g., the writer 530). Layers of dielectric material 526 separate two or more of the reader 528, reader shields 532, 534, and second resistance temperature sensor 510. In some implementations, one or both reader shields 532, 534 are not present. In another implementation, the first resistance temperature sensor 506 is installed in a post-deposition processing step.

Still moving in the y-direction, the first return pole 536 is deposited with a layer of dielectric material 526 separating the second reader shield 534 from the first return pole 536. The writer 530 and the first resistance temperature sensor 506 are deposited on the first return pole 536 and the second return pole 538 is deposited on the writer 530 and the first resistance temperature sensor 506. Layers of dielectric material 526 separate each of the writer 530, first resistance temperature sensor 506, and return poles 536, 538. In some implementations, one or both return poles 536, 538 are not present. In another implementation, the first and/or second resistance temperature sensors 506, 510 are installed in post-deposition processing. The heater 548 is deposited adjacent to the second return pole 538. The heater 548 is adapted to expand when powered, thereby pushing one or more microelectronic components closer to a storage media (not shown).

The dielectric material 526 covers the second return pole 538 and seals the microelectronic components from an external environment. The dielectric material 526 may comprise one material for all areas of the transducer head 502 or it may comprise different materials for layers of dielectric material 526 adjacent the substrate 540, between the microelectronic components, and/or sealing the microelectronic components from the external environment. Magnetic flux flows from the writer 530 to the storage media in close proximity to the writer 530 and back through one or both of the return poles 536, 538 in order to write bits of data to the media.

The resistance temperature sensors 506, 510 may be located elsewhere on the transducer head 502 and/or slider 522 so long as one resistance temperature sensor is closer to a close point (discussed in detail below) than the other resistance temperature sensor. The resistance temperature sensors 506, 510 may be of any type including but not limited to carbon resistors, thermistors, film thermometers, wire-wound thermometers, and coil elements. Further, the resistance temperature sensors 506, 510 are often made of platinum. However, other materials with a generally linear temperature-resistance relationship may also be used for the resistance temperature sensors 506, 510. In still other implementations, thermocouples may be used in place of the resistance temperature sensors 506, 510.

Figure 6:
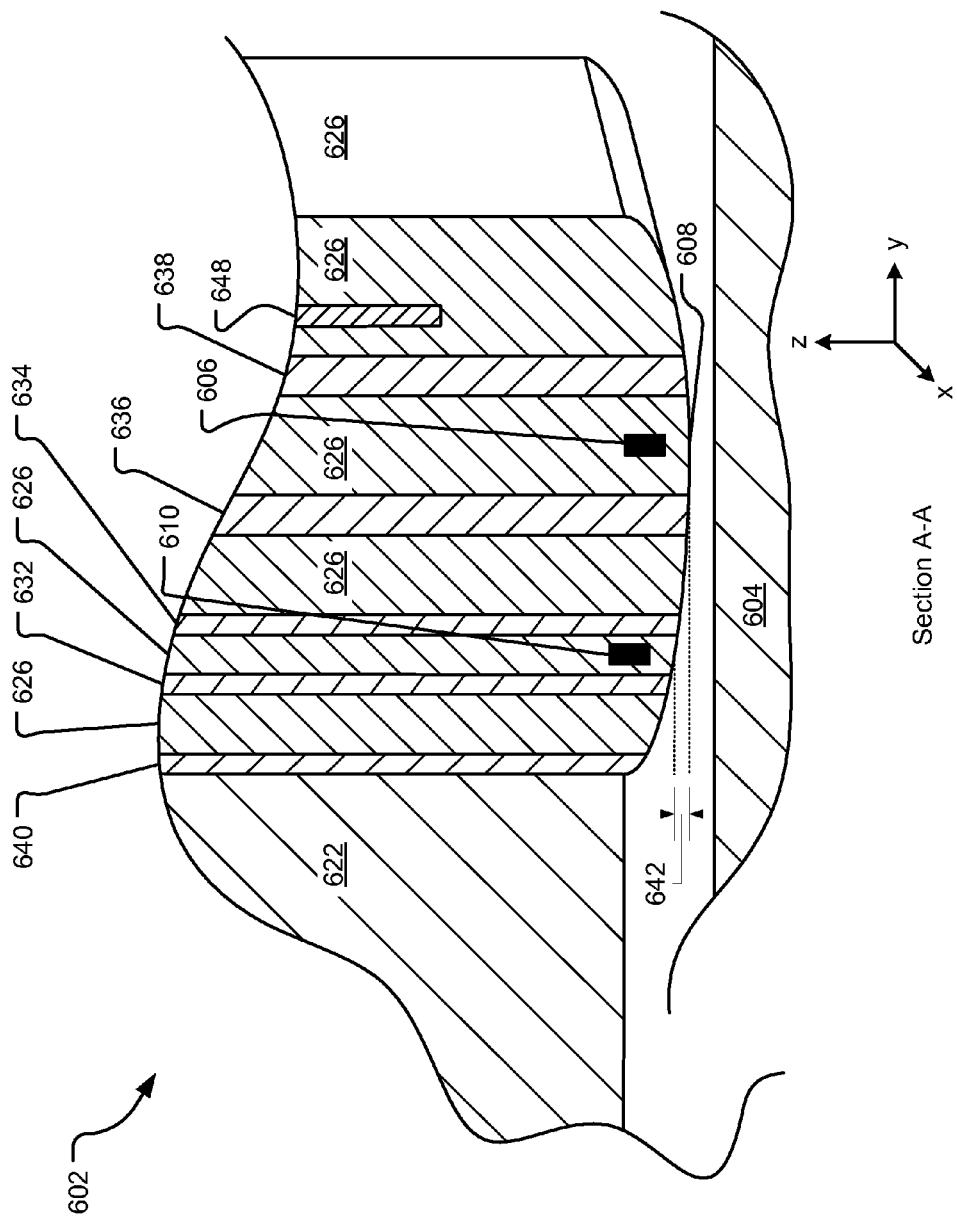
FIG. 6 illustrates a sectional isometric view of the example transducer head of FIG. 3 at Section A-A.

FIG. 6 illustrates a sectional isometric view of the example transducer head 502 of FIG. 5 at Section A-A. FIG. 6 is for illustrative purposes only and does not indicate scale of any of the depicted microelectronic components (i.e., a reader (not shown), a writer (not shown), a first reader shield 632, a second reader shield 634, a first return pole 636, a second return pole 638, a first resistance temperature sensor 606, a second resistance temperature sensor 610 and/or a heater 648) comprising a transducer head 602 with respect to a slider 622 and/or a storage media 604. For example, the thickness of the microelectronic components and dielectric material 626 in the y-direction may be exaggerated with respect to the width in the x-direction and height in the z-direction of the microelectronic components and the dielectric material 626.

As described in detail with respect to FIG. 5, moving in the y-direction, FIG. 6 depicts dielectric material 626 deposited on a substrate 640. The first reader shield 632 is deposited on the dielectric material 626. The reader (not shown) as well as the second resistance temperature sensor 610 are deposited adjacent the first reader shield 632. The second reader shield 634 is deposited adjacent the reader (not shown) and the second resistance temperature sensor 610. One or more layers of dielectric material 626 separates the reader (not shown), second resistance temperature sensor 610, first reader shield 632, and/or second reader shield 634 from one another.

Still moving in the y-direction, dielectric material 626 separates the second reader shield 634 from a first return pole 636. The writer (not shown) as well as a first resistance temperature sensor 606 are deposited adjacent the first return pole 636. The second return pole 638 is deposited adjacent the writer (not shown) and the first resistance temperature sensor 606. One or more layers of dielectric material 626 separate the writer (not shown), first resistance temperature sensor 606, first return pole 636, and/or second return pole 638 from one another. The dielectric material 626 covers the second return pole 638 and seals the microelectronic components from the environment. In some implementations, portions of the microelectronic components facing the media 604 are left exposed.

Typically, one or more of the microelectronic components are positioned closer to the media 604 than other microelectronic components (i.e., a close point 608). For example, in many implementations the writer (not shown) is positioned closer to the media 604 than the reader (not shown) is. Further, the first resistance temperature sensor 606 is positioned closer to the close point 608 than the second resistance temperature sensor 610. The variations in distance may be caused by a curvature of the surface of transducer head 602 facing the media 604 as shown in FIG. 6. Further, some microelectronic components (e.g., the writer (not shown) may extend out of the transducer head 602 toward the media 604, instead of or in addition to the effect of curvature of the surface of transducer head 602 facing the media 604. Distance 642 illustrates a fly height difference between the close point 608 of the transducer head 602 where the first resistance temperature sensor 606 is approximately located and a point spaced away from the close point 608 where the second resistance temperature sensor 610 is located. The resistance temperature sensors 606, 610 may be located elsewhere on the transducer head 602 and/or slider 622 so long as one resistance temperature sensor is closer to the close point 608 than the other resistance temperature sensor.

The transducer head 602 may also be equipped with a heater 648 attached to or in close proximity to one or more of the microelectronic components. The heater 648 is adapted to expand when powered, thereby pushing one or more microelectronic components closer to the media 604 (negative z-direction). For example, the heater 648 may push the first return pole 636 closer to the media 604, make the first return pole 636 the closest microelectronic component to the media 604, and thus make the first return pole 636 the close point 608. Similarly, the heater 648 can also contract when not powered or powered less to move the first return pole 636 spaced away from the media 604 (positive z-direction).

In other implementations, the heater 648 is attached to or in close proximity to one or more of the other microelectronic components (e.g., the reader 628, the writer 630, the first reader shield 632, the second reader shield 634, the second return pole 638, the first temperature sensor 606, and/or the second temperature sensor 610) and moves the other microelectronic component(s) in the positive z-direction and/or negative z-direction. In this implementation, one or more of the other microelectronic components attached to the heater 648 is the close point 608.

In an example implementation, a DC component of heater power linearly increases from 20 mW to 100 mW while resistances (indicating temperature) of the first resistance temperature sensor 606 and second resistance temperature sensor 610 are monitored. The resistance of the second resistance temperature sensor 610 increases linearly with the heater power over the entire heater power range because second resistance temperature sensor 610 is located away from the close point 608 and the thermal boundary condition at the second resistance temperature sensor 610 does not substantially change as the close point 608 comes in close proximity and subsequently in contact with the media 604. In some implementations, there may be a modulating AC component of the heater power as well that modulates at a known frequency. A thermal actuation controller controls the DC and AC (if present) components of the heater power.

The resistance of the first resistance temperature sensor 606 similarly increases linearly with the heater power up to about 60 mW. Between 60 mW and 80 mW, however, the resistance of the first resistance temperature sensor 606 remains relatively unchanged, indicating that the close point 608 is in close proximity with the media 604. An increase in thermal conductivity near the close point 608 compensates for the increasing heater power and results in the relatively unchanged temperature of the first resistance temperature sensor 606 between 60 mW and 80 mW of heater power.

Above 80 mW, the resistance of the first resistance temperature sensor 606 resumes a linear increasing trend, indicating contact of the close point 608 with the media 604. Saturation of the thermal conductivity at the close point 608 and additional friction-inducing heating caused by contact with the media 604 causes the linear increasing trend of resistance to resume above 80 mW. Close proximity and/or contact of the close point 608 with the media 604 can be detected by monitoring a threshold difference between the change in resistance of the second resistance temperature sensor 610 and the change in resistance of the first resistance temperature sensor 606.

Figure 7:
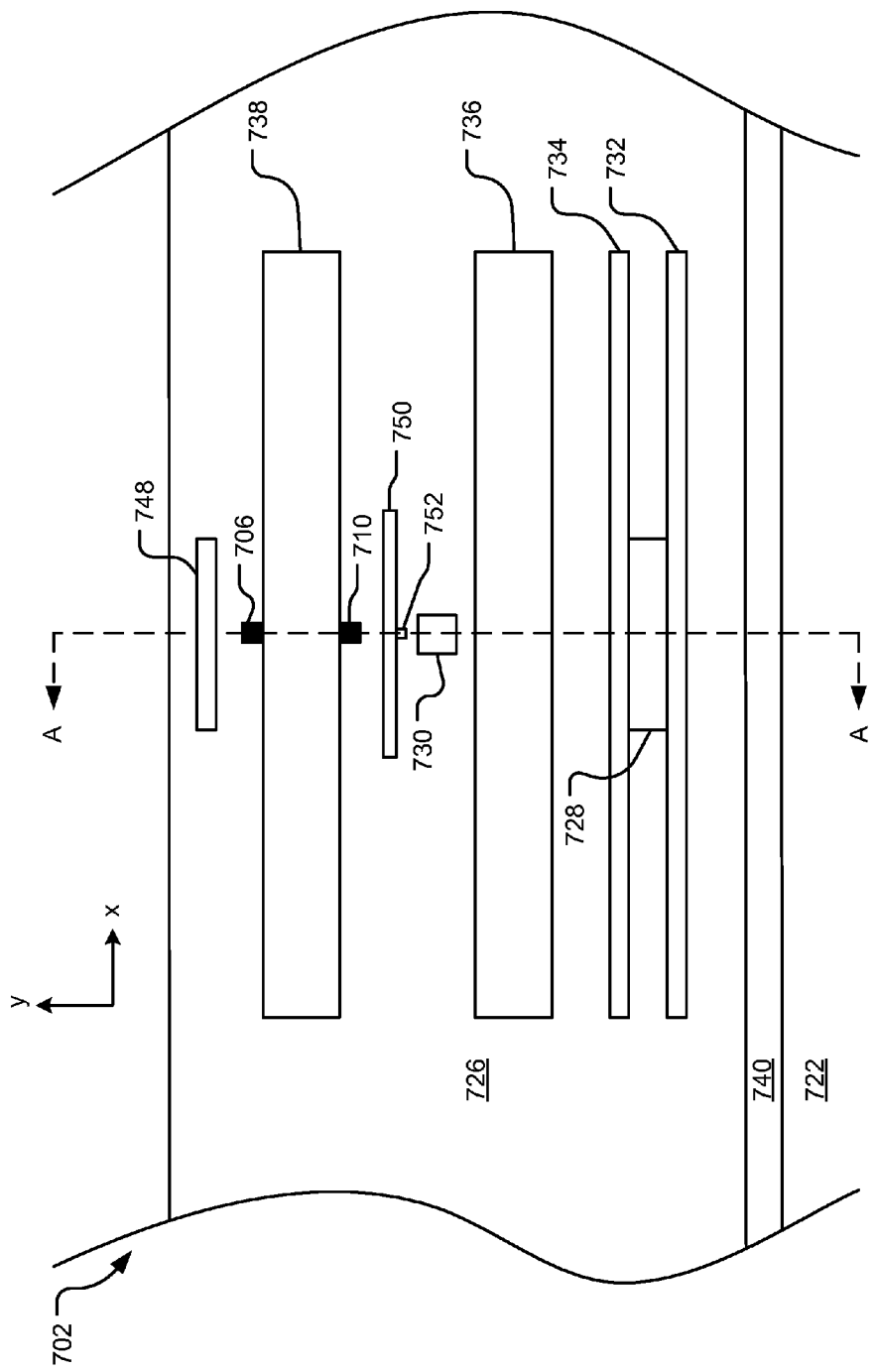
FIG. 7 illustrates a plan view of an example HAMR transducer head deposited on a trailing surface of a slider including a pair of differential resistance temperature sensors.

FIG. 7 illustrates a plan view of an example HAMR transducer head 702 deposited on a trailing surface of a slider 722 including a pair of differential resistance temperature sensors 706, 710. The HAMR transducer head 702 includes various microelectronic components for reading and writing information to and from a storage media (i.e., a reader 728, a writer 730, a first reader shield 732, a second reader shield 734, a first return pole 736, a second return pole 738, a laser diode (not shown), a waveguide core 750, a near-field transducer 752, and a heater 748) which are mounted on a substrate 740 and separated by dielectric material 726. The microelectronic components are also separated from an external environment by the dielectric material 726. In other implementations, additional microelectronic components may be deposited on the slider 722. The transducer head 702 is not shown to scale in FIG. 7. In many implementations, thickness in the y-direction is very small with respect to the width in the x-direction of the substrate 740, the microelectronic components, and/or the dielectric material 726.

The transducer head 702 may be installed onto the slider 722 using a variety of microelectronic fabrication techniques, as described in detail with respect to FIG. 5. Further, in one implementation, the first reader shield 732, reader 728, second reader shield 734, first return pole 736, and writer 730 are deposited on the dielectric material 726 as described in detail with respect to FIG. 5. The waveguide core 750, which can serve as a path for light from a light source (not shown) and the near-field transducer 752 are deposited adjacent the writer 730 with a layer of dielectric material 726 separating the writer 730 from the waveguide core 750 and the near-field transducer 752. The second return pole 738 is deposited adjacent the waveguide core 750 with the second resistance temperature sensor 710 deposited between the second return pole 738 and the waveguide core 750. The first resistance temperature sensor 706 is deposited on the opposite side of the second return pole 738, spaced away from the waveguide core 750.

The heater 748 is deposited adjacent to the second return pole 738. The heater 748 is adapted to expand when powered, thereby pushing one or more microelectronic components closer to a storage media (not shown). Layers of dielectric material 726 separate each of the writer 730, waveguide core 750, return pole 738, and heater 748. In some implementations, one or both return poles 736, 738 are not present. In another implementation, the first and/or second resistance temperature sensors 706, 710 are installed in post-deposition processing steps. The dielectric material 726 covers the second return pole 738 and seals the microelectronic components from an external environment.

In the HAMR transducer head 702 of FIG. 7, the laser diode (not shown), waveguide core 750, and near-field transducer 752 work together to locally heat an area on a storage media (not shown). In one implementation, the laser diode produces a beam of light that is directed to the near-field transducer 752 via the waveguide core 750. The near-field transducer 752 focuses the light on a desired location on the storage media to locally heat the storage media so that less energy is required to shift the polarity of the storage media at the heated spot. In some implementations, a light source other than a laser diode is used for the HAMR transducer head 702 of FIG. 7.

The resistance temperature sensors 706, 710 may be located elsewhere on the transducer head 702 and/or slider 722 so long as one resistance temperature sensor is closer to the waveguide core 750 (and thus light from the laser diode) than the other resistance temperature sensor. The resistance temperature sensors 706, 710 may be of any type including but not limited to carbon resistors, film thermometers, wire-would thermometers, and coil elements. Further, the resistance temperature sensors 706, 710 are often made of platinum. However, other materials with a generally linear temperature-resistance relationship may also be used for the resistance temperature sensors 706, 710. In still other implementation, thermocouples may be used in place of the resistance temperature sensors 706, 710.

Figure 8:
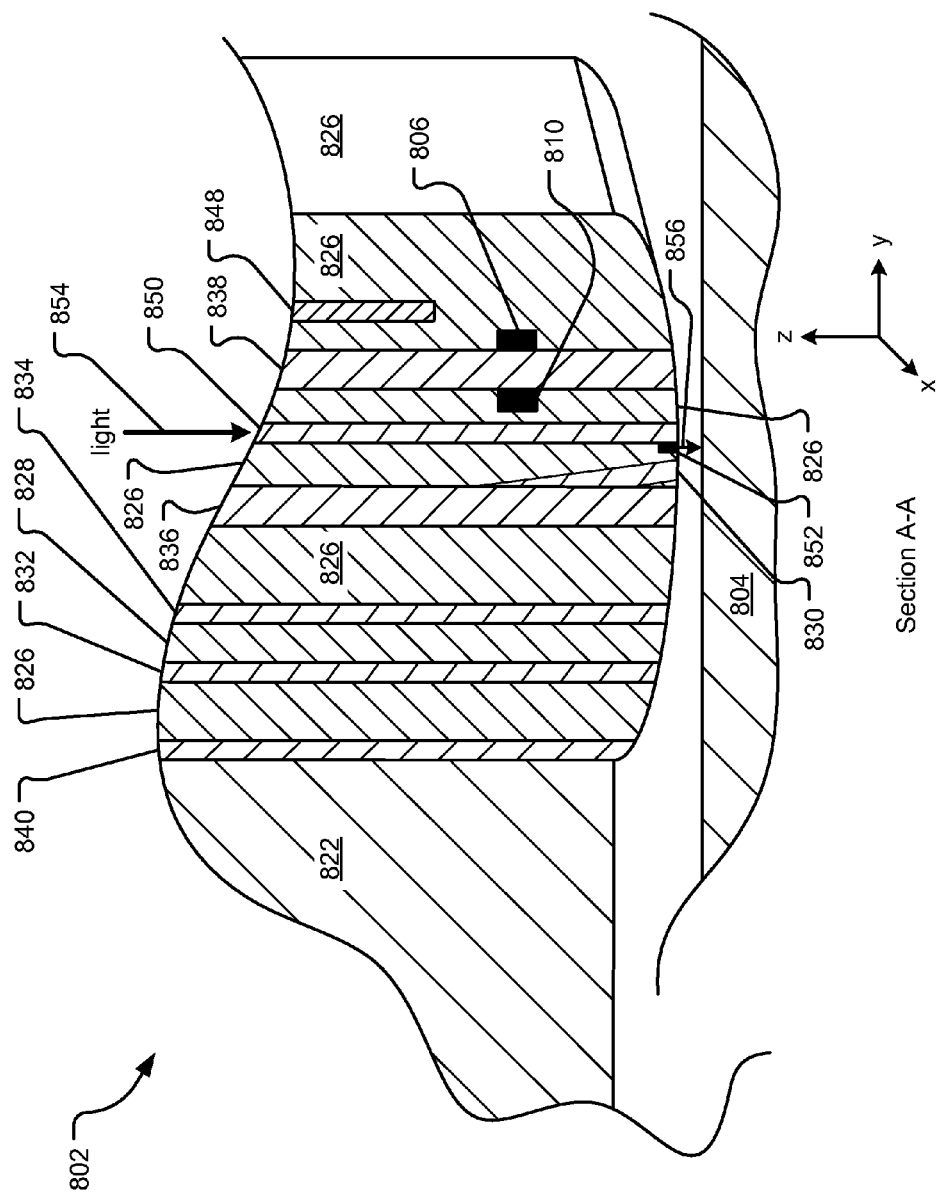
FIG. 8 illustrates a first example sectional isometric view of the example HAMR transducer head of FIG. 6 at Section A-A.

FIG. 8 illustrates a first example sectional isometric view of the example HAMR transducer head 702 of FIG. 7 at Section A-A. FIG. 8 is for illustrative purposes only and does not indicate scale of any of the depicted microelectronic components (i.e., a reader 828, a writer 830, a first reader shield 832, a second reader shield 834, a first return pole 836, a second return pole 838, a laser diode (not shown), a waveguide core 850, a near-field transducer 852, a first resistance temperature sensor 806, a second resistance temperature sensor 810 and/or a heater 848) comprising a transducer head 802 with respect to a slider 822 and/or a storage media 804. For example, the thickness of the microelectronic components and dielectric material 826 in the y-direction may be exaggerated with respect to the width in the x-direction and height in the z-direction of the microelectronic components and the dielectric material 826.

As described in detail with respect to FIG. 7, moving in the y-direction, FIG. 8 depicts dielectric material 826 deposited on a substrate 840. The first reader shield 832 is deposited on the dielectric material 826. The reader 828 is deposited adjacent the first reader shield 832 and the second reader shield 834 is deposited adjacent the reader 828. One or more layers of dielectric material 626 separates the reader 828, first reader shield 832, and/or second reader shield 834 from one another.

Still moving in the y-direction, dielectric material 826 separates the second reader shield 834 from the first return pole 836. The writer 830 is deposited adjacent the first return pole 836. The waveguide core 850 and the near-field transducer 852 are deposited adjacent the writer 830. A second return pole 838 is deposited with the second resistance temperature sensor 810 between the second return pole 838 and the waveguide core 850 and the first resistance temperature sensor 806 on the side of the second return pole 838 spaced away from the waveguide core 850. One or more layers of dielectric material 826 separate the writer 830, waveguide core 850, near-field transducer 852, first resistance temperature sensor 806, second resistance temperature sensor 810, first return pole 836, and/or second return pole 838 from one another. The dielectric material 826 seals the microelectronic components from the environment, however in some implementations; portions of the microelectronic components facing the media 804 are left exposed.

The transducer head 802 may also be equipped with a heater 848 attached to or in close proximity to one or more of the microelectronic components. The heater 848 is adapted to expand when powered, thereby pushing one or more microelectronic components closer to the media 804 (negative z-direction). For example, the heater 848 may push the first return pole 836 closer to the media 804. Similarly, the heater 848 can also contract when not powered or powered less to move the first return pole 836 spaced away from the media 804 (positive z-direction).

In an example implementation, light (illustrated by arrow 854) generated by a laser diode (not shown) is transmitted through the HAMR transducer head 802 via the waveguide core 850 to the near-field transducer 852. The near-field transducer 852 focuses the light onto a desired location on the media 804 (illustrated by arrow 856). Resistance (indicating temperature) of the second resistance temperature sensor 610 measures light output from the laser diode (not shown). The first resistance temperature sensor 806 is positioned away from the waveguide core 850. As a result, the resistance (indicating temperature) of the first resistance temperature sensor 806 much less or not at all affected by changing output from the laser diode (not shown). Therefore, temperature chances experienced by both the first resistance temperature sensor 806 and the second resistance temperature sensor 610 may be filtered out yielding an accurate measure of light output from the laser diode (not shown).

Figure 9:
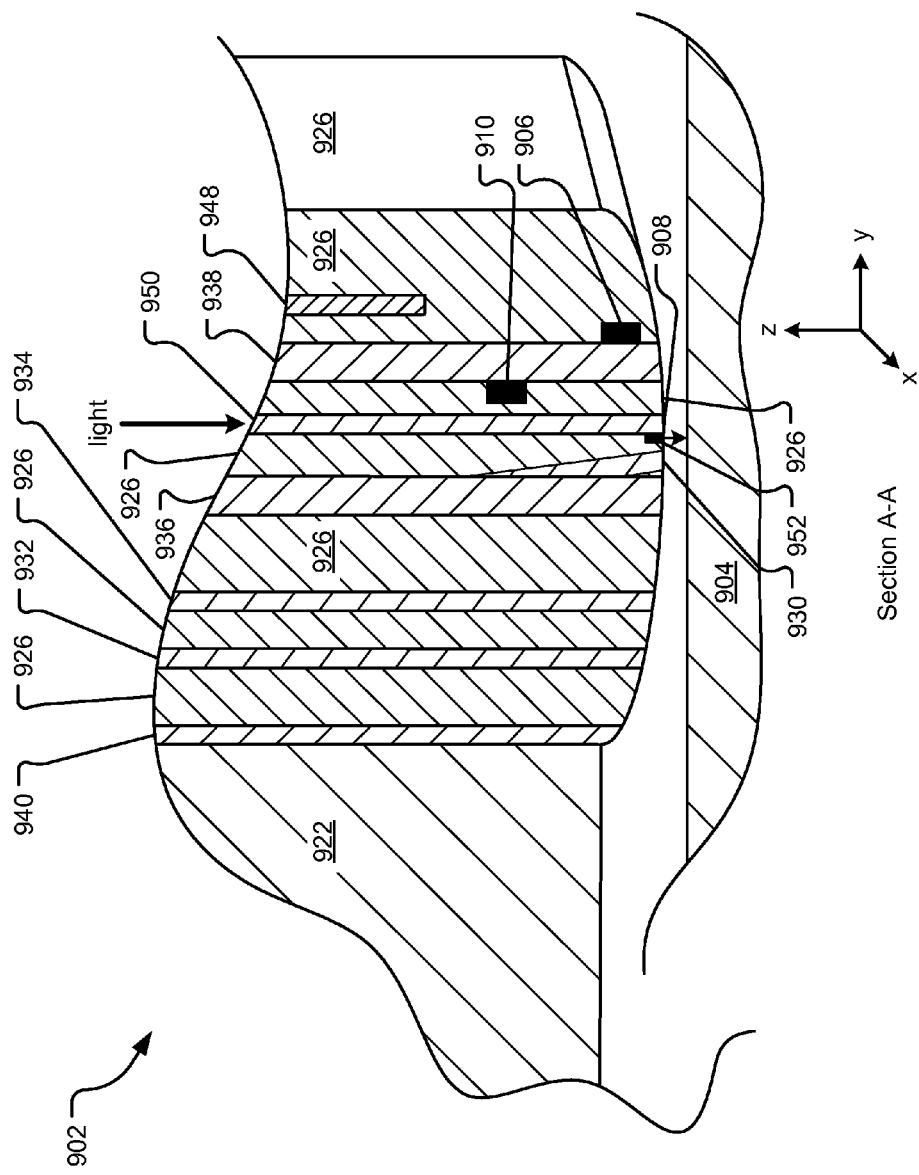
FIG. 9 illustrates a second example sectional isometric view of the example HAMR transducer head of FIG. 6 at Section A-A.

FIG. 9 illustrates a second example sectional isometric view of the example HAMR transducer head 702 of FIG. 7 at Section A-A. FIG. 9 is for illustrative purposes only and does not indicate scale of any of the depicted microelectronic components (i.e., a reader 928, a writer 930, a first reader shield 932, a second reader shield 934, a first return pole 936, a second return pole 938, a laser diode (not shown), a waveguide core 950, a near-field transducer 952, a first resistance temperature sensor 906, a second resistance temperature sensor 910 and/or a heater 948) comprising a transducer head 902 with respect to a slider 922 and/or a storage media 904. For example, the thickness of the microelectronic components and dielectric material 926 in the y-direction may be exaggerated with respect to the width in the x-direction and height in the z-direction of the microelectronic components and the dielectric material 926. Further, the depicted microelectronic components may be assembled as disclosed in detail with respect to FIGS. 7 & 8.

In FIG. 9, the first resistance temperature sensor 906 and the second resistance temperature sensor 910 are oriented on opposite sides of the second return pole 938, similar to the implementation of FIG. 8. As a result, the second resistance temperature sensor 910 is significantly more sensitive to temperature changes caused by light output from the laser diode (not shown) than the first resistance temperature sensor 906.

The first resistance temperature sensor 906 is moved near the close point similar to the implementation of FIG. 6. As a result, the first temperature sensor 906 is significantly more sensitive to temperature changes caused by proximity and/or contact of the close point 908 with the media 904 than the second resistance temperature sensor 910.

The configuration of the first resistance temperature sensor 906 and the second resistance temperature sensor 910 of FIG. 9 enables the HAMR transducer head 902 to detect both close proximity and/or contact of the close point 908 with the media 904 as described in detail with respect to FIG. 6 and light output from the laser diode (not shown) as described in detail with respect to FIG. 8. More specifically, when the light output from the laser diode is held at a constant value, the first resistance temperature sensor 906 and the second resistance temperature sensor 910 may be implemented to detect close proximity and/or contact of the close point 908 with the media 904. Further, when the heater power is held at a constant value, the resistance temperature sensor 906 and the second resistance temperature sensor 910 may be implemented to detect light output from the laser diode (not shown).

Figure 10:
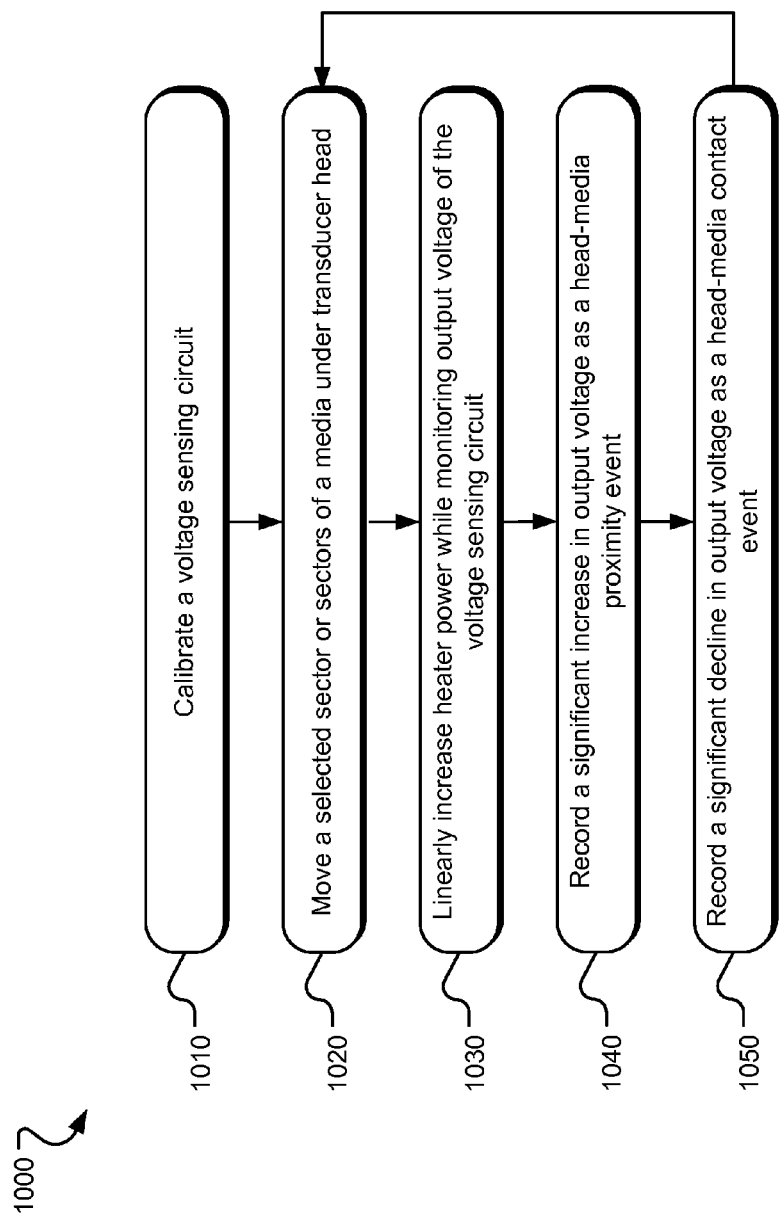
FIG. 10 illustrates example operations for mapping surface contours on a media using transducer head temperature monitoring.

FIG. 10 illustrates example operations 1000 for mapping surface contours on a media using transducer head temperature monitoring. For example, the operations 1000 may apply to the transducer head 102, 502, 602 and HAMR transducer head 302, 702, 902 implementations depicted in FIGS. 1A, 1B, 3A, 3B, 5, 6, 7, & 9. In one implementation, a transducer head or HAMR transducer head (collectively a transducer head) for reading and/or writing data from/to the media is equipped with two resistance temperature sensors, one near a close point of the transducer head with the media and the other a known distance away from the close point. In a calibration operation 1010, current applied to one or both of the resistance temperature sensors in a differential resistance circuit is calibrated to yield a voltage difference of zero across the resistance temperature sensors when the resistance temperature sensors are at the same temperature. In an alternative implementation, the current applied to one or both resistance temperature sensors is calibrated to yield a known non-zero voltage difference across the resistance temperature sensors.

In yet another implementation, a number of known factors are responsible for temperature variations in a transducer head (e.g., laser output (in a HAMR implementation), heater output, ambient drive temperature, write coil output, reader current, proximity/contact of the transducer head with the media). At least a laser diode, a heater, a write coil, a reader, and a close point of the transducer head with the media are referred to herein as a heat variation sources. At least the laser output (in a HAMR implementation), heater output, ambient drive temperature, write coil output, reader current, proximity/contact of the transducer head with the media are referred to herein as performance metrics. In the calibration operation 1010, one or more of the known factors for temperature variation are mapped to determine their contribution to a voltage difference across the resistance temperature sensors during expected normal operation of the transducer head or HAMR transducer head.

The natural roughness and/or surface contours on the media affect fly height of the transducer head depending on its location over the media. In a moving operation 1020, the transducer head is moved over a selected track sector or cluster on the media for mapping surface contours of the selected track sector or sectors. In other implementations, selected tracks and/or geometrical sectors are used to map surface contours of the media.

In a heating operation 1030, heater power is linearly increased while the transducer head is moved over the selected track sector or cluster on the media and the voltage difference is monitored for change. As the heater power is increased, the close point of the transducer head is brought closer to the media. The voltage difference is used to detect when the close point is brought in close proximity and/or in contact with the media.

As the heater power is linearly increased, the voltage difference will eventually increase as well, indicating that the transducer head is in close proximity to the media. In a first recordation operation 1040, when the voltage difference exceeds a predefined threshold, a head-media proximity event is recorded. Further, as the heater power is increased further, the increasing voltage difference will eventually reverse and begin to decline, indicating that the transducer head is in contact with the media. In a second recordation operation 1050, when the voltage difference reverses direction and declines from a peak magnitude, a head-media contact event is recorded.

The first recordation operation 1040 and second recordation operation 1050 are used to set transducer head fly height while the transducer head is flying over the selected track sector or sectors. In one implementation, the fly height is set at a heater power within the voltage difference recorded between the head-media proximity event and the head-media contact event. Moving operation 1020, heating operation 1030, first recordation operation 1040, and second recordation operation 1050 may be repeated for each track sector or cluster on the media and/or varying operating conditions of the transducer head. As a result, the transducer head fly height (or head-media spacing (HMS)) can be specifically calibrated for reading and/or writing data to/from all portions of the media. For example, power supplied to a heater using a thermal actuation controller may be varied to maintain a selected fly height over all portions of the media.

In some implementations, the proximity and/or contact detection operations described with regard to FIG. 10 are performed once during commissioning of the data storage device to map surface contours of the media. The mapped surface contours are used to set fly height of the transducer head. In other implementations, the proximity and/or contact detection operations are performed periodically, to set the fly height of the transducer head. For example, the contact detection operations may be performed every time there is a significant change in elevation of the data storage device or every time the data storage device crashes due to impact of the transducer head with the media. In yet another implementation, the proximity and/or contact detection operations are repeated iteratively during drive operation to monitor HMS and adjust the heater power to maintain a desired HMS. In an implementation such as that depicted in FIGS. 7 and 9, the aforementioned operations 1000 may be used for proximity/contact detection of the transducer head with the media as well as laser power detection as detailed in operations 1100.

While the aforementioned operations 1000 specifically refer to measuring a difference between resistance values of two temperature sensors that yields a voltage difference, the presently disclosed technology may utilize only one temperature sensor to detect laser output, heater output, ambient drive temperature, write coil output, reader current, and/or proximity/contact of the transducer head with the media. Further, the resistance values of the two temperature sensors may be either added or subtracted from one another to yield a noise-adjusted laser output, heater output, ambient drive temperature, write coil output, reader current, and/or proximity/contact of the transducer head with the media.

Figure 11:
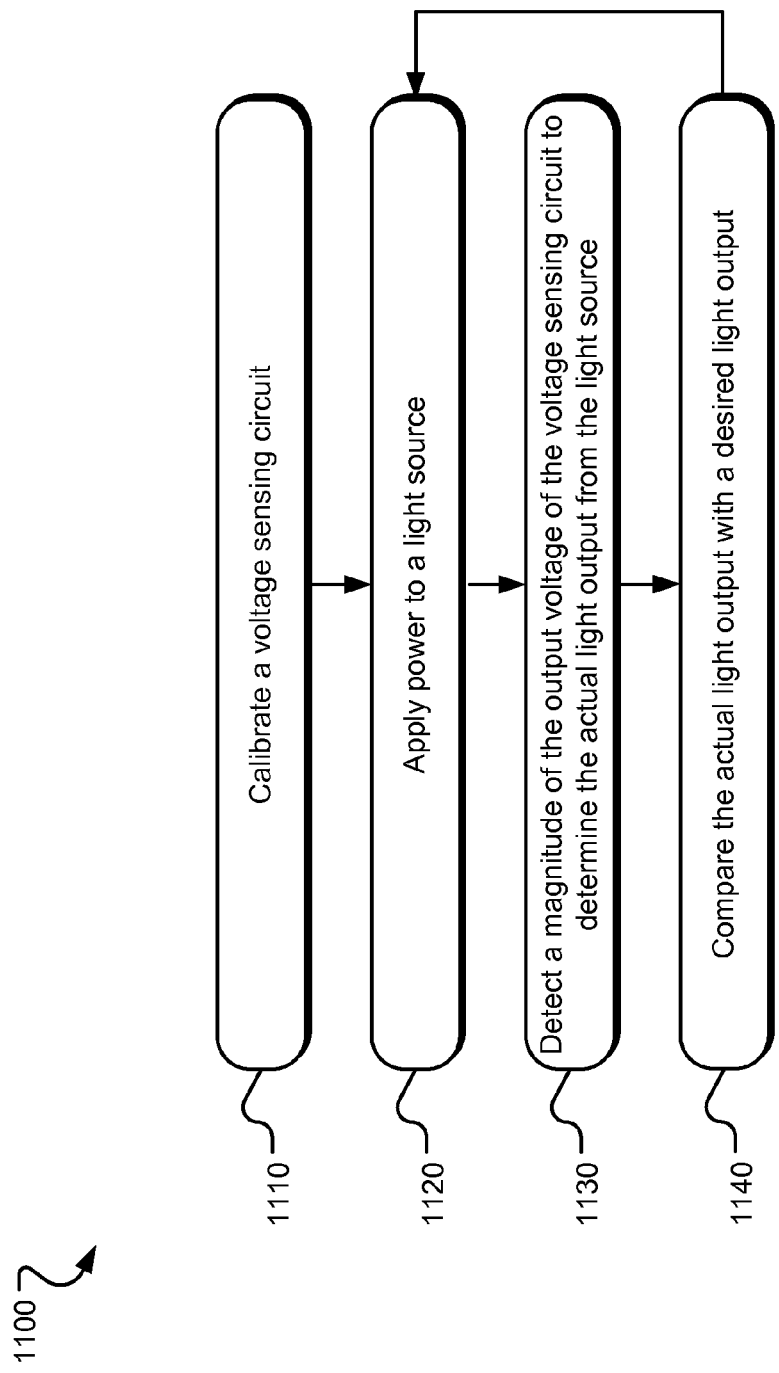
FIG. 11 illustrates example operations for detecting light output in a HAMR transducer head using transducer head temperature monitoring.

FIG. 11 illustrates example operations 1100 for detecting light output in a HAMR transducer head using transducer head temperature monitoring. For example, the operations 1100 may apply to the HAMR transducer head 202, 702, & 802 implementations depicted in FIGS. 2A, 2B, 7, & 8. In one implementation, a HAMR transducer head for heat-assisted reading and/or writing data from/to the media is equipped with two resistance temperature sensors, one near a light source (e.g., a laser diode, waveguide, and/or near-field transducer) and the other a known distance away from the light source. In a calibration operation 1110, current applied to one or both of the resistance temperature sensors in a differential resistance circuit is calibrated to yield a voltage difference of zero across the resistance temperature sensors when the resistance temperature sensors are at the same temperature. In an alternative implementation, the current applied to one or both resistance temperature sensors is calibrated to yield a known non-zero voltage difference across the resistance temperature sensors.

In yet another implementation, a number of known factors are responsible for temperature variations in a HAMR transducer head (e.g., laser output, heater output, ambient drive temperature, write coil output, reader current, and proximity/contact of the transducer head with the media). At least a laser diode, a heater, a write coil, a reader, and a close point of the transducer head with the media are referred to herein as a heat variation sources. At least the laser output (in a HAMR implementation), heater output, ambient drive temperature, write coil output, reader current, proximity/contact of the transducer head with the media are referred to herein as performance metrics. In the calibration operation 1110, one or more of the known factors for temperature variation are mapped to determine their contribution to voltage difference across the resistance temperature sensors during expected normal operation of the transducer head or HAMR transducer head.

Laser output directly affects the recording performance in a HAMR transducer head. In applying operation 1120, power is applied to the light source (e.g., a laser diode) during a recording operation. In one implementation, the light source is capable of affecting the temperature of the resistance temperature sensor near the light source by approximately 0.4 degrees Celsius. The initial power input into the light source may be a preset value known to be close to a desired light output. In a detecting operation 1130, a detected voltage difference is used to determine an actual light output of the light source to the media. In a feedback operation 1140, the actual light output is compared to a desired light output and the power applied to the light source is changed to achieve the desired light output. In one implementation, operations 1120, 1130, & 1140 are repeated iteratively during drive operation to monitor light output and update the power is applied to the light source to maintain a desired light output. In another implementation, operations 1120, 1130, & 1140 are performed once during commissioning of the drive to map light output to power is applied to the light source. The mapped correlation between light output and power input is used to set power applied to the light source in a variety of conditions. In other implementations, the contact detection operations are performed periodically, to map light output to power is applied to the light source.

While the aforementioned operations 1100 specifically refer to measuring a difference between resistance values of two temperature sensors that yields a voltage difference, the presently disclosed technology may utilize only one temperature sensor to detect laser output, heater output, ambient drive temperature, write coil output, reader current, and/or proximity/contact of the transducer head with the media. Further, the resistance values of the two temperature sensors may be either added or subtracted from one another to yield a noise-adjusted laser output, heater output, ambient drive temperature, write coil output, reader current, and/or proximity/contact of the transducer head with the media.

The embodiments of the invention described herein may be implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A transducer head comprising:
   two temperature sensors at two disparate distances from a light source on the transducer head, wherein a difference between temperatures of each of the two temperature sensors indicates light output from the light source.

2. The transducer head of claim 1, wherein the light source is a heat-assisted magnetic recording light source.

3. The transducer head of claim 1, wherein the light source is one or more of a laser diode, waveguide, and a near-field transducer.

4. The transducer head of claim 1, wherein the temperature sensors are positioned on opposite sides of a return pole within the transducer head.

5. The transducer head of claim 1, wherein a first sensor of the two temperature sensors is at a first distance from a light path running from the light source to a media and a second sensor of the two temperature sensors is at a second distance from the light path, wherein the second distance is greater than the first distance.

6. The transducer head of claim 1, wherein each of the temperature sensors are resistance temperature sensors and the temperatures of each of the two temperature sensors are measured as resistance values and the difference between temperatures of each of the two temperature sensors is measured as a voltage.

7. The transducer head of claim 1, further comprising:
   a heater configured to bring a close point of the transducer head with the media closer to the media.

8. The transducer head of claim 7, wherein heater power changes fly height or maintains a selected fly height as the transducer head flies over the media.

9. The transducer head of claim 7, wherein the heater is controlled by a thermal actuation controller that modulates power to the heater at a known frequency.

10. The transducer head of claim 1, wherein a current modulator modulates current applied to each of the temperature sensors at a known frequency.

11. The transducer head of claim 1, wherein power to the light source is adjusted based on the light output.

12. A heat-assisted magnetic recording (HAMR) transducer head comprising:
a light source; and
a first temperature sensor at a first distance from the light source; and
a second temperature sensor at a second distance from the light source, wherein a voltage difference across the temperature sensors indicates light output by the light source.

13. The HAMR transducer head of claim 12, wherein the difference between temperatures of each of the two temperature sensors further indicates contact of the transducer head with the media at the close point.

14. The HAMR transducer head of claim 12, wherein the first temperature sensor and the second temperature sensor are positioned on opposite sides of the return pole.

15. The HAMR transducer head of claim 12, wherein the light source is one or more of a laser diode, waveguide, and a near-field transducer.

16. A method of detecting light output in a heat assisted magnetic recording (HAMR) transducer head comprising:
applying power to a light source within the HAMR transducer head;
measuring a first resistance change at a first temperature sensor at a first distance from the light source;
measuring a second resistance change at a second temperature sensor at a second distance from the light source, wherein the second distance is greater than the first distance; and
detecting light output of the light source by measuring a voltage difference across the first and second temperature sensors.

17. The method of claim 16, wherein the first temperature sensor and the second temperature sensor are positioned on opposite sides of a return pole within the HAMR transducer head.

18. The method of claim 16, wherein the first temperature sensor is at a first distance from a light path running from the light source to a media and the second temperature sensor is at a second distance from the light path, wherein the second distance is greater than the first distance.

19. The method of claim 16, further comprising:
adjusting the power to the light source to achieve a desired light output of the light source.

20. The method of claim 16, further comprising:
modulating power applied to one or more of a heater on the HAMR transducer head and each of the two temperature sensors at a known frequency.

* * * * *